(12) United States Patent
Patil

(10) Patent No.: US 8,584,247 B1
(45) Date of Patent: Nov. 12, 2013

(54) SYSTEMS AND METHODS FOR EVALUATING COMPLIANCE CHECKS

(75) Inventor: Dipak Patil, Sangli (IN)

(73) Assignee: Symantec Corporation, Mountain View, CA (US)

( * ) Notice: Subject to any disclaimer, the term of this patent is extended or adjusted under 35 U.S.C. 154(b) by 653 days.

(21) Appl. No.: 12/797,301

(22) Filed: Jun. 9, 2010

(51) Int. Cl.
G06F 7/04 (2006.01)

(52) U.S. Cl.
USPC .............. 726/25; 726/4; 726/5; 726/6; 726/7

(58) Field of Classification Search
None
See application file for complete search history.

(56) References Cited

U.S. PATENT DOCUMENTS

| | | | | |
|---|---|---|---|---|
| 6,782,421 B1 * | 8/2004 | Soles et al. | | 709/223 |
| 6,901,346 B2 * | 5/2005 | Tracy et al. | | 702/181 |
| 7,231,668 B2 * | 6/2007 | Jacobson | | 726/26 |
| 7,653,893 B2 * | 1/2010 | Neumann et al. | | 717/101 |
| 7,853,468 B2 * | 12/2010 | Callahan et al. | | 705/7.28 |
| 2006/0282276 A1 * | 12/2006 | Venzon et al. | | 705/1 |
| 2007/0124803 A1 * | 5/2007 | Taraz | | 726/4 |
| 2007/0226721 A1 * | 9/2007 | Laight et al. | | 717/154 |
| 2008/0172270 A1 * | 7/2008 | Eckenroth | | 705/7 |
| 2009/0125382 A1 * | 5/2009 | Delepet | | 705/10 |

* cited by examiner

*Primary Examiner* — Saleh Najjar
*Assistant Examiner* — Oleg Korsak
(74) *Attorney, Agent, or Firm* — ALG Intellectual Property, LLC

(57) ABSTRACT

A computer-implemented method for evaluating compliance checks may include (1) maintaining a group of compliance standards for at least one computing network, with each compliance standard comprising at least one compliance check for evaluating at least one aspect of a network device, (2) calculating a reputation score for at least one compliance check within the group of compliance standards, (3) assigning the reputation score to the compliance check, and then (4) providing a recommendation for whether to implement the compliance check based at least in part on the reputation score assigned to the compliance check.

20 Claims, 15 Drawing Sheets

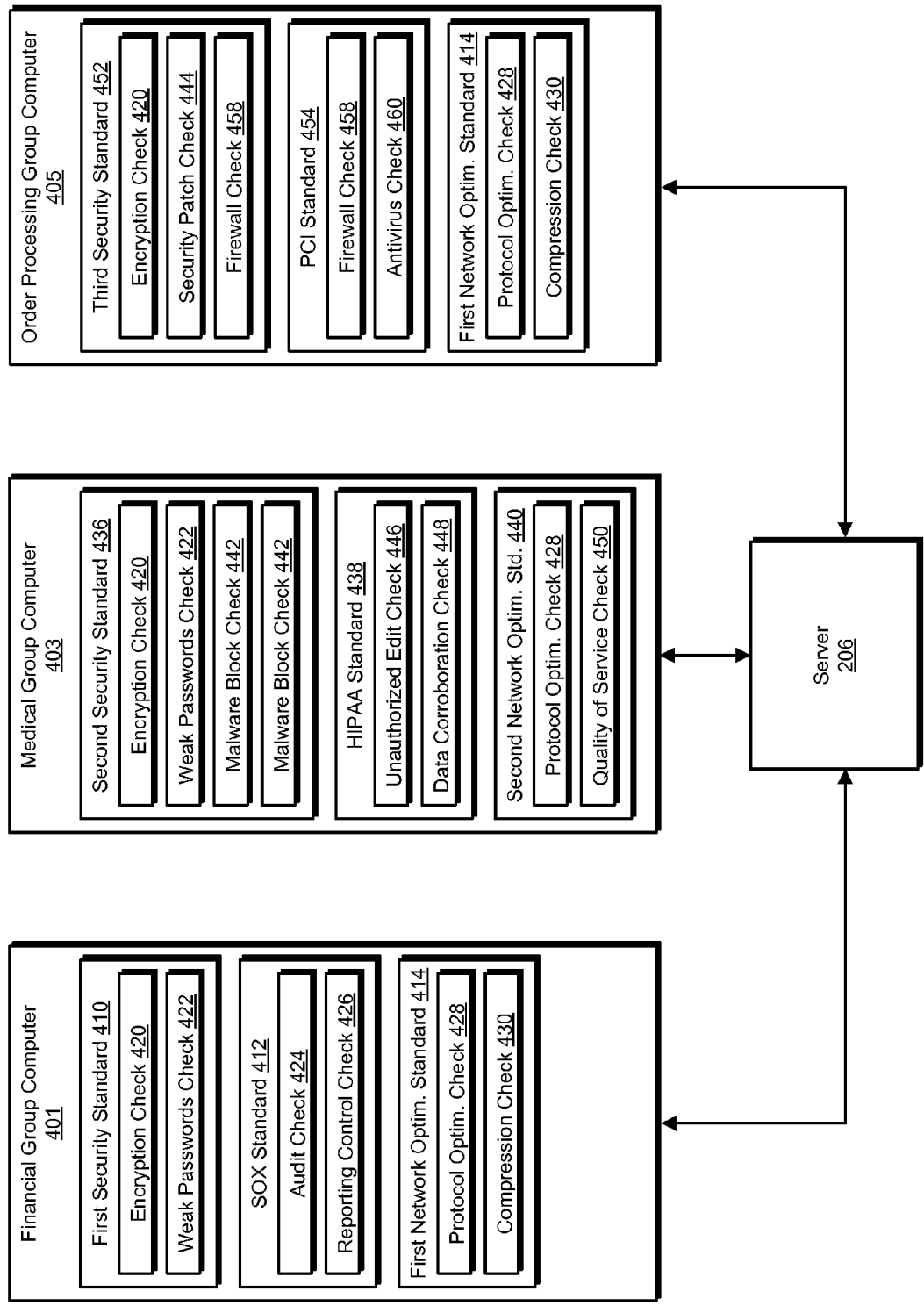

| Check Column | Standard Column | Prevalence C. | Source Column | Efficacy C. | Scope C. | Score C. |
|---|---|---|---|---|---|---|
| Encryption | First Security | 37.5% | Microsoft: 95% | 90% | Security | 96% |
|  | Second Security | 544 |  | 548 | Windows | 550 |
|  | Third Security |  |  |  | Windows 7 |  |
| Weak Passwords | First Security | 25% | 128.98...: 30% | 92% | Security | 80% |
|  | Second Security |  |  |  | Windows |  |
| Audit | SOX | 12.5% | Financial G.: 98% | 80% | financial | 68% |
| Reporting Control | SOX | 12.5% | Norton: 98% | 75% | financial | 66% |
| Protocol Optimiz. | First Network Opt. | 25% | Motorola: 98% | 78% | Network Opt. | 82% |
|  | Sec. Network Opt. |  |  |  | Network Opt. |  |
| Compression | First Network Opt. | 12.5% | Medical G: 98% | 95% | Network Opt. | 91% |
| Malware Block | Second Security | 12.5% | AVG: 99% | 67% | Windows | 45% |
| Security Patch | Second Security | 25% | Microsoft: 95% | 70% | Windows | 72% |
|  | Third Security |  |  |  | Windows 7 |  |
| Unauthorized Edit | HIPAA | 12.5% | 125.37....: 20% | 50% | Windows | 50% |
| Data Corrob. | HIPAA | 12.5% | Medical G.: 98% | 80% | Windows | 78% |
| Quality of Service | Sec. Network Opt. | 12.5% | Financial G: 98% | 84% | Network Opt. | 82% |
| Firewall | Third Security | 25% | AVG: 99% | 91% | Windows 7 | 93% |
|  | PCI |  |  |  | Windows XP |  |
| Antivirus | PCI | 12.5% | AVG: 99% | 84% | Windows XP | 83% |

Map 532

Source Options Panel 546

Prevalence Options Panel 534

- 536 ● standard-proportion
- 538 ○ instance-proportion
- 540 ○ device-proportion Bottom Panel 530

*FIG. 5*

| Check Column | Standard Column | Prevalence C. | Source Column | Efficacy C. | Scope C. | Score C. |
|---|---|---|---|---|---|---|
| Encryption | First Security | 37.5% | Microsoft: 95% | 90% | Security | 96% |
| | Second Security | | | | Windows | |
| | Third Security | | | | Windows 7 | |
| Weak Passwords | First Security | 25% | 128.98...: 30% | 92% | Security | 80% |
| | Second Security | | | | Windows | |
| Audit | SOX | 12.5% | Financial G.: 98% | 80% | financial | 68% |
| Reporting Control | SOX | 12.5% | Norton: 98% | 75% | financial | 66% |
| Protocol Optimiz. | First Network Opt. | 25% | Motorola: 98% | 78% | Network Opt. | 82% |
| | Sec. Network Opt. | | | | Network Opt. | |
| Compression | First Network Opt. | 12.5% | Medical G: 98% | 95% | Network Opt. | 91% |
| Malware Block | Second Security | 12.5% | AVG: 99% | 67% | Windows | 45% |
| Security Patch | Second Security | 25% | Microsoft: 95% | 70% | Windows | 72% |
| | Third Security | | | | Windows 7 | |
| Unauthorized Edit | HIPAA | 12.5% | 125.37....: 20% | 50% | Windows | 50% |
| Data Corrob. | HIPAA | 12.5% | Medical G.: 98% | 80% | Windows | 78% |
| Quality of Service | Sec. Network Opt. | 12.5% | Financial G: 98% | 84% | Network Opt. | 82% |
| Firewall | Third Security | 25% | AVG: 99% | 91% | Windows 7 | 93% |
| | PCI | | | | Windows XP | |
| Antivirus | PCI | 12.5% | AVG: 99% | 84% | Windows XP | 83% |

Efficacy Options Panel 602

Select Efficacy Test:
- Test 1
- Test 2
- Test 3
- Test 4

Number of incidents on computers with this check in the last six months:

Jan Feb Mar Apr May Jun

| Check Column | Standard Column | Prevalence C. | Source Column | Efficacy C. | Scope C. | Score C. |
|---|---|---|---|---|---|---|
| Encryption | First Security | 37.5% | Microsoft: 95% | 90% | Security | 96% |
| | Second Security | | | | Windows | |
| | Third Security | | | | Windows 7 | |
| Weak Passwords | First Security | 25% | 128.98...: 30% | 92% | Security | 80% |
| | Second Security | | | | Windows | |
| Audit | SOX | 12.5% | Financial G.: 98% | 80% | financial | 68% |
| Reporting Control | SOX | 12.5% | Norton: 98% | 75% | financial | 66% |
| Protocol Optimiz. | First Network Opt. | 25% | Motorola: 98% | 78% | Network Opt. | 82% |
| | Sec. Network Opt. | | | | Network Opt. | |
| Compression | First Network Opt. | 12.5% | Medical G: 98% | 95% | Network Opt. | 91% |
| Malware Block | Second Security | 12.5% | AVG: 99% | 67% | Windows | 45% |
| Security Patch | Second Security | 25% | Microsoft: 95% | 70% | Windows | 72% |
| | Third Security | | | | Windows 7 | |
| Unauthorized Edit | HIPAA | 12.5% | 125.37....: 20% | 50% | Windows | 50% |
| Data Corrob. | HIPAA | 12.5% | Medical G.: 98% | 80% | Windows | 78% |
| Quality of Service | Sec. Network Opt. | 12.5% | Financial G: 98% | 84% | Network Opt. | 82% |
| Firewall | Third Security | 25% | AVG: 99% | 91% | Windows 7 | 93% |
| | PCI | | | | Windows XP | |
| Antivirus | PCI | 12.5% | AVG: 99% | 84% | Windows XP | 83% |

702 Edit Score Formula:

704 ○ Define the score mathematically in terms of prevalence (P), source (S), and Efficacy (E): 710

[ ] OK

706 ○ Increase or decrease weights: 712

Prevalence 2.7  Source 1.2  Efficacy 2.7

708 ○ Select pre-defined formula from: 714

1. Drop down menu 1016   2. Browse for source:  Browse 718

*FIG. 7*

| Check Column | Standard Column | Prevalence C. | Source Column | Efficacy C. | Scope C. | Score C. |
|---|---|---|---|---|---|---|
| Encryption | First Security | 37.5% | Microsoft: 95% | 90% | Security | 96% |
|  | Second Security |  |  |  | Windows |  |
|  | Third Security |  |  |  | Windows 7 |  |
| Weak Passwords | First Security | 25% | 128.98...: 30% | 92% | Security | 80% |
|  | Second Security |  |  |  | Windows |  |
| Audit | SOX | 12.5% | Financial G.: 98% | 80% | financial | 68% |
| Reporting Control | SOX | 12.5% | Norton: 98% | 75% | financial | 66% |
| Protocol Optimiz. | First Network Opt. | 25% | Motorola: 98% | 78% | Network Opt. | 82% |
|  | Sec. Network Opt. |  |  |  | Network Opt. |  |
| Compression | First Network Opt. | 12.5% | Medical G: 98% | 95% | Network Opt. | 91% |
| Malware Block | Second Security | 12.5% | AVG: 99% | 67% | Windows | 45% |
| Security Patch | Second Security | 25% | Microsoft: 95% | 70% | Windows | 72% |
|  | Third Security |  |  |  | Windows 7 |  |
| Unauthorized Edit | HIPAA | 12.5% | 125.37....: 20% | 50% | Windows | 50% |
| Data Corrob. | HIPAA | 12.5% | Medical G.: 98% | 80% | Windows | 78% |
| Quality of Service | Sec. Network Opt. | 12.5% | Financial G: 98% | 84% | Network Opt. | 82% |
| Firewall | Third Security | 25% | AVG: 99% | 91% | Windows 7 | 93% |
|  | PCI |  |  |  | Windows XP |  |
| Antivirus | PCI | 12.5% | AVG: 99% | 84% | Windows XP | 83% |

Compliance Standard Addition Panel 802

Add a compliance standard (fourth security standard):

Currently included compliance checks:
Intrusion detection check 806

Currently Included Checks Panel 804

Add more compliance checks:
1. From top panel above; or
2. From source: Browse

When finished, please click: OK

*FIG. 8*

| Check Column | Standard Column | Prevalence C. | Source Column | Efficacy C. | Scope C. | Score C. |
|---|---|---|---|---|---|---|
| Encryption | First Security | 33.3% | Microsoft: 95% | 90% | Security | 94% |
|  | Second Security |  |  |  | Windows |  |
|  | Third Security |  |  |  | Windows 7 |  |
| Weak Passwords | First Security | 33.3% | 128.98...: 30% | 92% | Security | 85% |
|  | Second Security |  |  |  | Windows |  |
|  | Fourth Security |  |  |  | Security |  |
| Audit | SOX | 11.1% | Financial G.: 98% | 80% | financial | 67% |
| Reporting Control | SOX | 11.1% | Norton: 98% | 75% | financial | 65% |
| Protocol Optimiz. | First Network Opt. | 22.2% | Motorola: 98% | 78% | Network Opt. | 80% |
|  | Sec. Network Opt. |  |  |  | Network Opt. |  |
| Compression | First Network Opt. | 11.1% | Medical G: 98% | 95% | Network Opt. | 90% |
| Malware Block | Second Security | 11.1% | AVG: 99% | 67% | Windows | 44% |
| Security Patch | Second Security | 22.2% | Microsoft: 95% | 70% | Windows | 70% |
|  | Third Security |  |  |  | Windows 7 |  |
| Unauthorized Edit | HIPAA | 11.1% | 125.37....: 20% | 50% | Windows | 49% |
| Data Corrob. | HIPAA | 11.1% | Medical G.: 98% | 80% | Windows | 77% |
| Quality of Service | Sec. Network Opt. | 11.1% | Finanicial G: 98% | 84% | Network Opt. | 81% |
| Firewall | Third Security | 22.2% | AVG: 99% | 91% | Windows 7 | 91% |
|  | PCI |  |  |  | Windows XP |  |
| Antivirus | PCI | 11.1% | AVG: 99% | 84% | Windows XP | 82% |
| Intrusion Detect. | Fourth Security | 11.1% | AVG: 99% | 74% | Security | 83% |

FIG. 10

SYSTEMS AND METHODS FOR EVALUATING COMPLIANCE CHECKS

BACKGROUND

Network administrators often implement compliance checks within the networks they administer in order to ensure that certain measures, such as measures to improve security and/or to satisfy private and/or government regulations, are active. For example, if a particular software application includes a vulnerability that enables unauthorized access to files, administrators may implement a security measure within a network in order to block execution of the software application on network devices. In this example, the administrators may also implement a compliance check within the network in order to ensure that the security measure is active.

Similarly, administrators may implement various measures within the networks they administer in order to ensure compliance with public and/or private regulations, such as Sarbanes-Oxley regulations (SOX) (which require, among other things, maintenance of an audit trail that accurately records security events), Health Insurance Portability and Accountability Act (HIPAA) regulations (which limit the manner in which organizations can disclose Protected Health Information), and/or the Payment Card Industry Data Security Standard (PCI DSS) (which places controls on the use of credit card information in order to prevent fraud). In these examples, administrators may also develop and implement various compliance checks in order to ensure that these measures are active.

As the number of compliance checks and compliance standards implemented within a network grows, management of the same may become increasingly difficult. In particular, separate groups within the same organization may diverge, over time, regarding the compliance checks and compliance standards that the different groups use. For example, an order-processing group may implement compliance checks to satisfy the PCI DSS, even when other groups within the organization fail to implement these checks. Similarly, one group within the organization may have identified a security breach, implemented a security measure to address the breach, and implemented a compliance check to ensure that the security measure is active. Other groups within the organization may, however, remain unaware of the security breach, the security measure, and/or the associated compliance check.

SUMMARY

As will be described in greater detail below, the instant disclosure generally relates to systems and methods for evaluating compliance checks. In particular, embodiments of the instant disclosure may analyze the compliance checks deployed within an organization (or organizations) in order to determine their prevalence, source, and/or efficacy and then provide recommendations for implementing the same based on this information.

In one example, the systems described herein may accomplish such a task by (1) maintaining a group of compliance standards for at least one computing network, with each compliance standard including at least one compliance check for evaluating at least one aspect of a network device, (2) calculating a reputation score for at least one compliance check within the group of compliance standards, (3) assigning the reputation score to the compliance check, and then (4) providing a recommendation for whether to implement the compliance check based at least in part on the reputation score assigned to the compliance check.

In some examples, the systems described herein may maintain the group of compliance standards by obtaining the group of compliance standards from a single computing network or a plurality of computing networks. For example, different users in a same corporation may purchase, license, and/or otherwise obtain a software package containing some of the systems disclosed herein. The users may then use the systems to submit or register compliance standards, such as software or network standards directed to security, efficiency, and/or regulatory compliance, to a centralized database. The systems described herein may then analyze the submitted or registered compliance standards and provide recommendations based on the analysis. Similarly, the compliance standards may be submitted or registered from different groups or organizations, including different corporations (even competing corporations), which may all have purchased, licensed, and/or otherwise obtained the software package.

In some examples, the systems described herein may store the group of compliance standards in a centralized database. For example, when different users submit or register compliance standards in the group of compliance standards, the disclosed systems may (in these examples) store the compliance standards in a centralized relational database. Alternatively, these systems may store the compliance standards in any other database or data structure for storing information about compliance standards and compliances checks. Although the database may provide a centralized logical or software location for the compliance standards, the database itself may be spread across multiple computers, nodes, or hardware implementations.

The systems described herein may calculate the reputation score for the compliance check based at least in part on the prevalence of the compliance check within the group of compliance standards, the source or origin of the compliance check, and/or the efficacy of the compliance check. The prevalence of the compliance check may reflect how absolutely or relatively prevalent the compliance check is among the group of compliance checks. The reputation score for the compliance check may be based on a reputation of a source of the compliance check. The efficacy of the compliance check may reflect how well the compliance check performs along one or more performance measures.

In some examples, the compliance checks used by the systems described herein may apply to a common platform. The common platform may be a common software and/or hardware platform. For example, the compliance checks may be directed to a common platform of WINDOWS 7 or the APPLE IPHONE. Further, compliance checks that apply to a common platform may be platform specific, so that they are only operable or applicable to that common platform. More generally, the compliance checks may have a same or similar scope, where the scope designates a common context, goal, or platform associated with the compliance checks. For example, instead of the scope indicating a common software or hardware platform, the scope may indicate a desired goal, feature, or context for the compliance checks.

The scope may be user-indicated or inferred by the disclosed systems. When the scope is user-indicated, a user may simply indicate the scope by typing or otherwise inputting the scope. For example, a user may indicate that two compliance checks are directed to the common scope of "security" by typing or otherwise indicating that term. In such cases, the scope may function in a manner substantially similar to "tags" in email or document archiving applications. Alternatively, or additionally, the systems described herein may infer a scope for a compliance check without user intervention. For example, these systems may infer a scope for a compliance checks based on the content of the compliance check, its similarity to other compliance checks (e.g., compliance checks with one or more known scopes), information about the user adding the compliance check, and/or information about the computers to which the compliance check is being activated (e.g., the compliance check is being applied to computers with a reputation for security risks implies that the compliance check is directed to security). Additionally or alternatively, examples of the disclosed systems may use any other information available that may help the systems make educated guesses about the context, goals, features, and/or hardware or software platforms associated with the compliance check, in order to define one or more scopes.

The systems described herein may also recommend modifying a compliance standard to include the compliance check. For example, a user of the described systems may wish to submit or register another compliance standard to a centralized database and/or group of compliance standards. Upon doing so, the user may begin to define and/or select one or more compliance checks. The compliance checks may be originally defined by the user or at the user's location, and/or the compliance checks may be selected from those previously submitted to, or registered with, the centralized database.

In some examples, compliance standards may be automatically submitted or registered with the centralized database when they are activated at a user's location (and/or de-registered when the compliance standard is deactivated). As the user adds compliance checks to the candidate compliance standard, which might not yet be registered with the centralized database, the described systems may infer one or more scopes for the compliance standard based on scopes of the already-added compliance checks. For example, if the user is adding several compliance checks directed to security, then the systems described herein may recommend compliance checks that 1) are not yet included within the candidate compliance standard and 2) have high reputations scores within the system. These systems may also determine or estimate a scope for the compliance standard based on scopes for compliance standards that are designated manually by a user or inferred by the system without user intervention.

The systems described herein may also add an additional compliance standard to the group of compliance standards and update the reputation score assigned to the compliance check based at least in part on the additional compliance standard. For example, these exemplary systems may calculate a reputation score for a compliance check based at least in part on how prevalent the compliance check is. The prevalence of the compliance check may represent an absolute or relative frequency of the compliance check among registered and/or activated compliance checks. For example, once a user registers a compliance standard that includes a particular compliance check, the exemplary systems may update a prevalence score (or information indicating prevalence) based on the newly-added compliance standard. Because the particular compliance check is now included within an additional compliance standard (which was just registered), the particular compliance check's prevalence score may increase, and its reputation score may also, therefore, increase.

The systems described herein may also evaluate compliance standards based on a reputation threshold. For example, the reputation threshold may indicate a threshold reputation score (e.g., reputation scores within the top 10% of reputation scores within the centralized database). The exemplary systems may identify at least one high-reputation compliance check within the group of compliance standards that satisfies the reputation threshold. The exemplary systems may also create a virtual reputation standard that includes the high-reputation compliance check. For example, if a user indicates a reputation threshold of 90%, and only one compliance check has a reputation score equal to or greater than 90% (or simply greater than), then these systems may include that compliance check within the virtual reputation standard. These systems may also compute an adherence score based on a comparison between a compliance standard that includes the compliance check and the virtual reputation standard. For example, compliance standards that include many or all of the compliance checks within the virtual reputation standard may receive higher adherence scores, whereas compliance standards that include few or none of those compliance checks may receive lower adherence scores. The computation of the adherence score may be based on any comparison of similarity between a compliance standard and the virtual reputation standard.

As will be explained in greater detail below, by aggregating information about activated and/or registered compliance standards from multiple source, the systems described herein may report that information, and/or analyses of that information, to aid users in adopting, registering, modifying, or otherwise managing compliance standards. In particular, the systems described herein may recommend compliance checks with high reputation scores to users for activation at a device associated with the user (or another device).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of network devices implementing an exemplary method for evaluating compliance checks.

FIG. 5 is a graphical user interface implementing an exemplary method for evaluating compliance checks.

FIG. 6 is a graphical user interface implementing an exemplary method for evaluating compliance checks.

FIG. 7 is a graphical user interface implementing an exemplary method for evaluating compliance checks.

FIG. 8 is a graphical user interface implementing an exemplary method for evaluating compliance checks.

FIG. 10 is an updated version of the graphical user interface in FIG. 5, after the addition of a compliance check.

Figure 1:
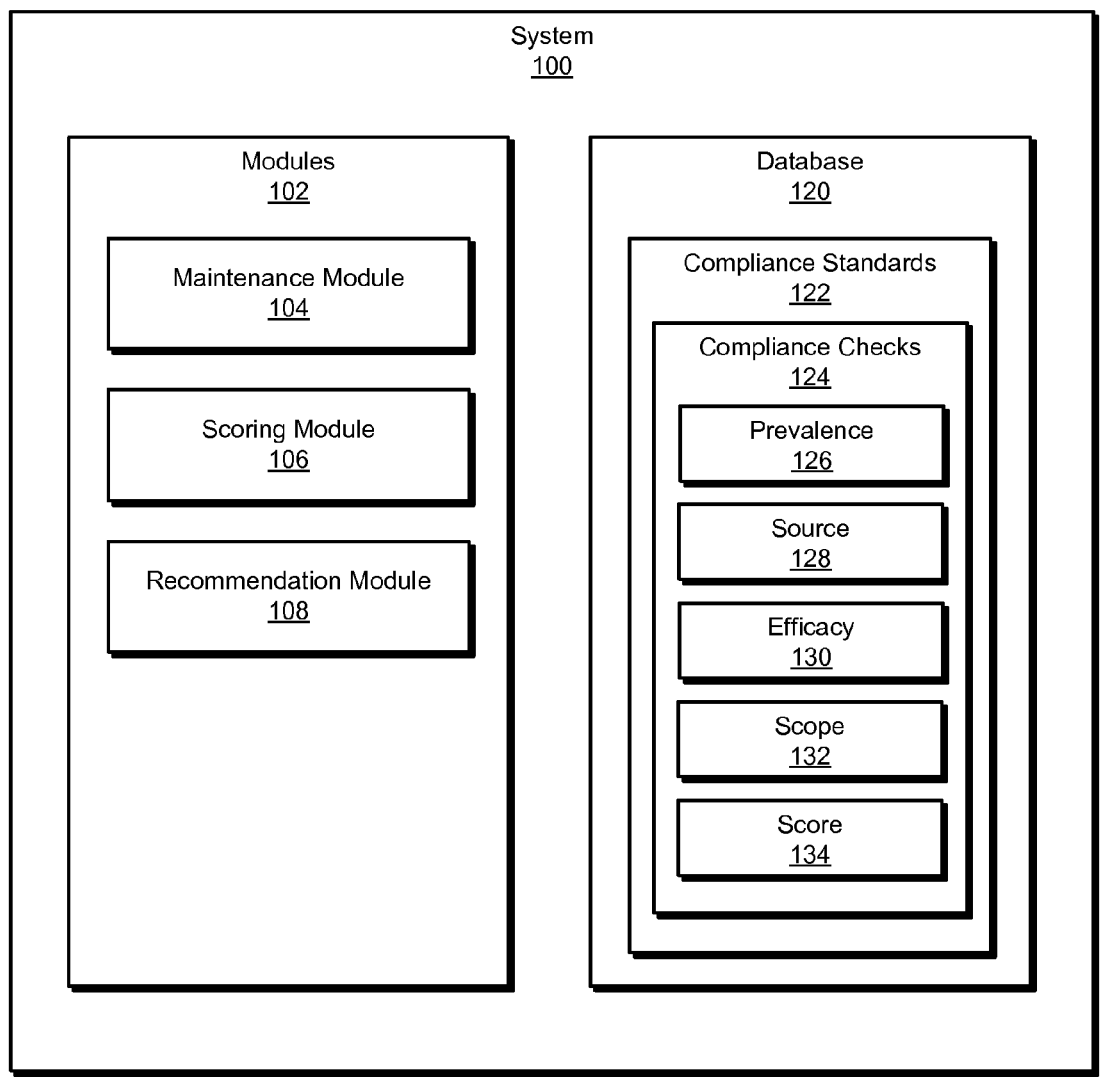
FIG. 1 is a block diagram of an exemplary system for evaluating compliance checks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for evaluating compliance checks. The following will provide, with reference to FIGS. 1, 2, 4, and 9, detailed descriptions of exemplary systems for evaluating compliance checks. Detailed descriptions of corresponding computer-implemented methods will also be provided in connection with FIGS. 3, 5-8, and 10-13. In addition, detailed descriptions of an exemplary computing system and network architecture capable of implementing one or more of the embodiments described herein will be provided in connection with FIGS. 14 and 15, respectively.

FIG. 1 is a block diagram of an exemplary system 100 for evaluating compliance checks. As illustrated in this figure, exemplary system 100 may include one or more modules 102 for performing one or more tasks. For example, and as will be explained in greater detail below, exemplary system 100 may include a maintenance module 104 programmed to maintain a group of compliance standards for at least one computing network, with each compliance standard including at least one compliance check for evaluating at least one aspect of a network device. Exemplary system 100 may also include a scoring module 106 programmed to calculate and assign a reputation score to at least one compliance check within the group of compliance standards.

In addition, and as will be described in greater detail below, exemplary system 100 may include a recommendation module 108 programmed to provide a recommendation for whether to implement the compliance check based at least in part on the reputation score assigned to the compliance check. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 1410 in FIG. 14, and/or portions of exemplary network architecture 1500 in FIG. 15. One or more of modules 102 in FIG. 1 may also represent all or portions of one or more special-purpose computers configured to perform one or more tasks.

As illustrated in FIG. 1, exemplary system 100 may also include one or more databases, such as database 120. Database 120 may include a relational database or any other suitable database or data structure for storing items of data and the relationships between them. In one example, database 120 may include compliance standards 122, which may in turn include compliance checks 124. As will be explained in greater detail below, data regarding prevalence 126, source 128, efficacy 130, scope 132, and reputation score 134 may also be included within compliance checks 124.

Database 120 may represent portions of a single database or computing device or a plurality of databases or computing devices. For example, database 120 may represent a portion of server 206 in FIG. 2, computing system 1410 in FIG. 14, and/or portions of exemplary network architecture 1500 in FIG. 15. Alternatively, database 120 in FIG. 1 may represent one or more physically separate devices capable of being accessed by a computing device, such as server 206 in FIG. 2, computing system 1410 in FIG. 14, and/or portions of exemplary network architecture 1500 in FIG. 15.

Figure 2:
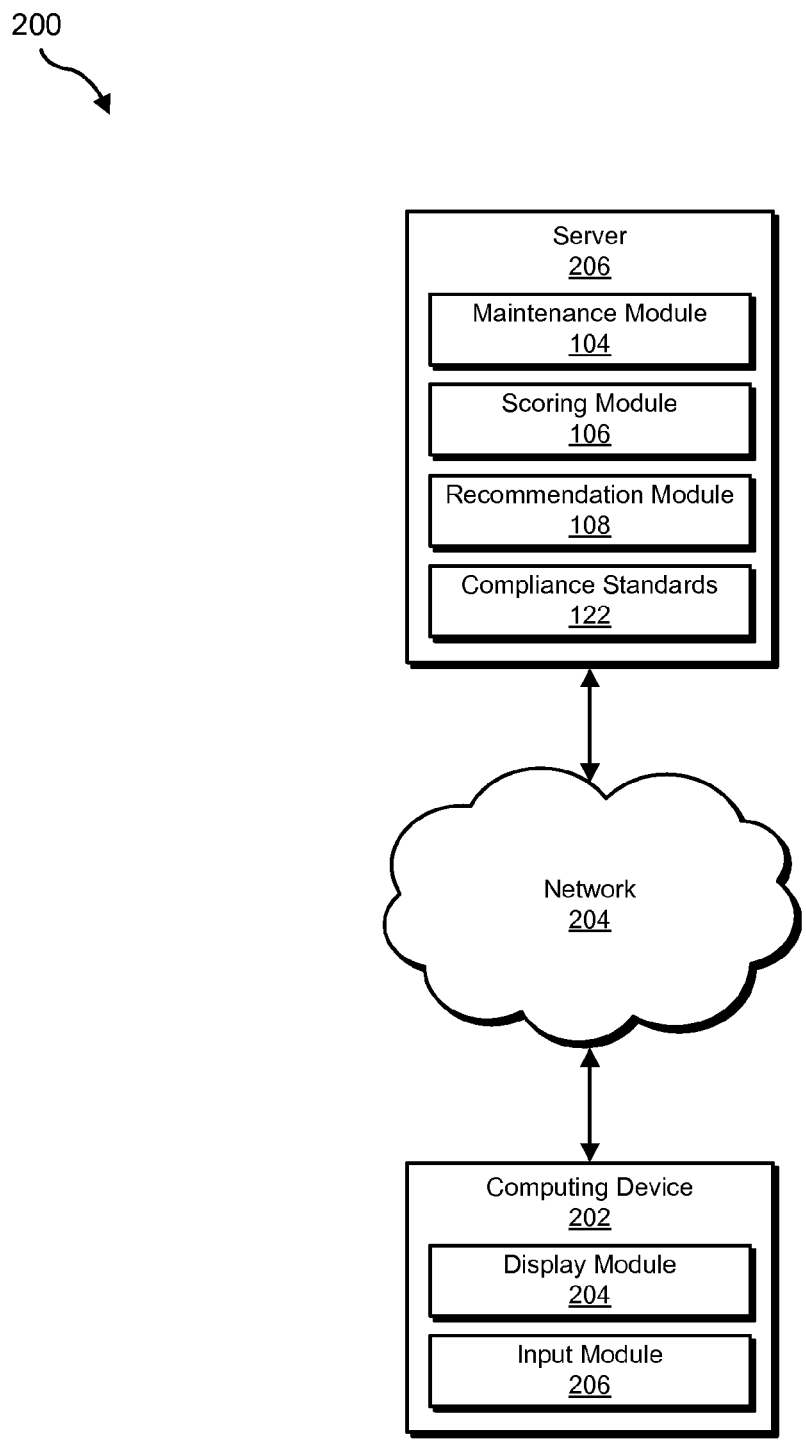
FIG. 2 is a block diagram of an exemplary system for evaluating compliance checks.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a server 206 via a network 204. In one embodiment, and as will be described in greater detail below, modules 102 from FIG. 1 may program server 206 to (1) maintain a group of compliance standards for system 200 (e.g., compliance standards 122), with each compliance standard including at least one compliance check for evaluating at least one aspect of a network device within system 200, (2) calculate a reputation score for at least one compliance check within the group of compliance standards, (3) assign the reputation score to the compliance check, and then (4) provide a recommendation for whether to implement the compliance check (to, e.g., a user of computing device 202) based at least in part on the reputation score assigned to the compliance check.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 1410 in FIG. 14, or any other suitable computing device. In one example, computing device 202 may include a display module 204 programmed to display information to a user and an input module 206 programmed to receive input from a user.

Server 206 generally represents any type or form of computing device that is capable of receiving information from computing system 202 and performing computations on the information. Examples of server 206 include, without limitation, application servers and database servers configured to provide various database services and/or run certain software applications.

In one example, server 206 may include maintenance module 104, scoring module 106, recommendation module 108, and database 120. Additionally or alternatively, module 104, scoring module 106, recommendation module 108, and/or database 120 may be included within computing system 202.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1500 in FIG. 15, or the like. Network 204 may facilitate communication or data transfer using wireless or wired connections. In one embodiment, network 204 may facilitate communication between computing device 202 and server 206.

Figure 3:
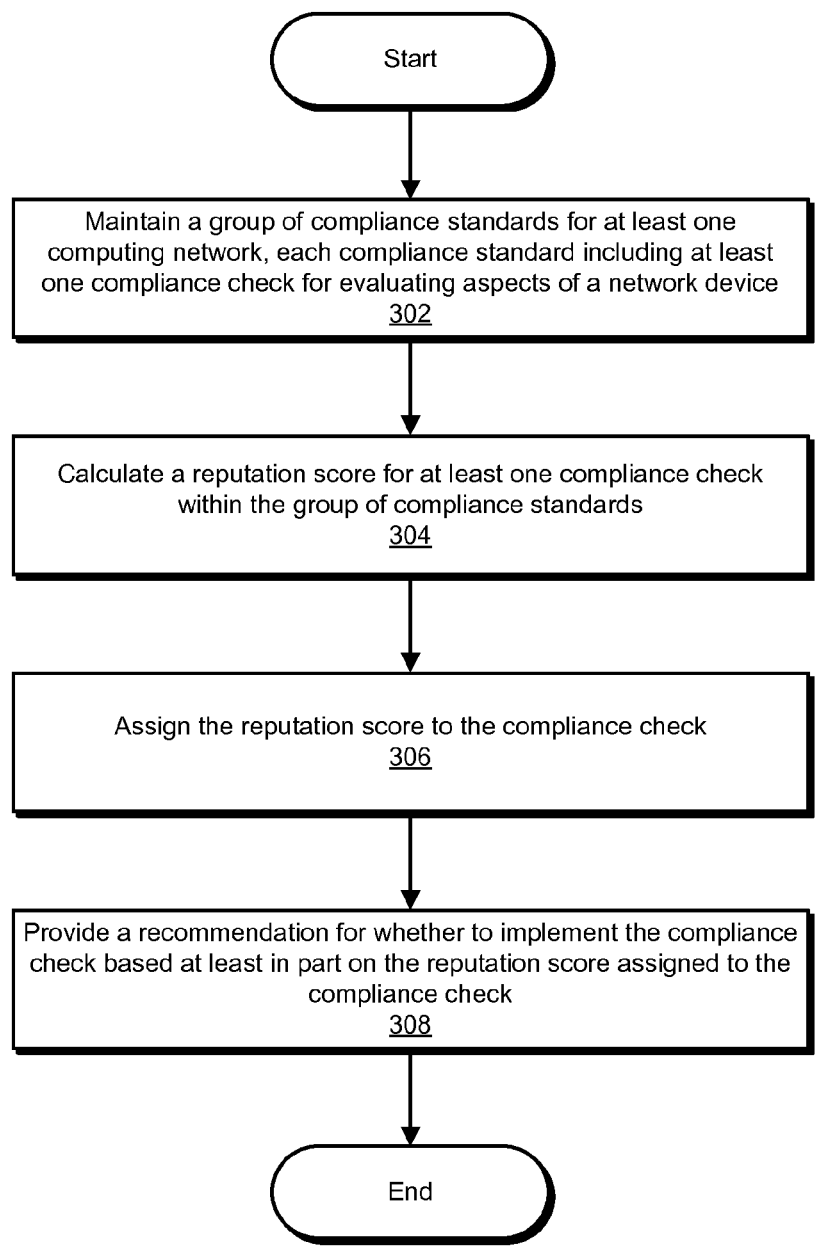
FIG. 3 is a flow diagram of an exemplary method for evaluating compliance checks.

FIG. 3 is a flow diagram of an exemplary computer-implemented method 300 for evaluating compliance checks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 3, at step 302 one or more of the systems described herein may maintain a group of compliance standards for at least one computing network, with each compliance standard including at least one compliance check for evaluating at least one aspect of a network device. For example, maintenance module 104 may, as part of server 206 in FIG. 2, may maintain compliance standards 122.

As used herein, the term "compliance check" may refer to any check that determines whether a desired measure is active on a network and/or ensures that the desired measure is active. In one example, the compliance check may base such a determination on an evaluation of an aspect of a network device (by, e.g., evaluating data from a network device). Likewise, as used herein, the term "compliance standard" may refer to any set of one or more compliance checks (e.g., defined for simultaneous activation on the same network).

Maintenance module 104 may maintain the group of compliance standards in a variety of ways. For example, maintenance module 104 may maintain a copy of database 120 on computing device 202 or server 206. As detailed above, database 120 may contain records and/or other data structures that identify compliance standards, compliance checks included in the compliance standards, and the locations where those compliance standards are registered and/or active. Database 120 may also store data indicating the relationships between these items of data (i.e., indicating which checks are included within which standards and indicating which standards are registered and/or active at which locations). Maintenance module 104 may also assign a pass/fail result to a device based on each compliance check. In short, database 120 may provide a snapshot of the compliance standard and compliance check information regarding a portion or the totality of a network at a given time.

The compliance standards stored in database 120 may be collected from independent entities. These independent entities may be independent groups of the same private or public organization, such as different offices or divisions of the same organization. The independent entities may also be independent corporations, businesses, or enterprises (even competitors). These business entities may have all purchased and/or licensed and used a software product that practices the disclosed subject matter. The persons within these independent entities may not be personally aware of all of the compliance standards and checks that other independent groups are using. The persons may, therefore, benefit from the disclosed systems and methods for collecting and aggregating the collective wisdom of the contributors.

For the purposes of the disclosed subject matter, a compliance check need not be active (e.g., actively determining whether the corresponding compliance measure is active or actively ensuring that the corresponding compliance measure is active) to be included within database 120, as discussed in detail below. Rather, a compliance check may simply be registered by a user of system 100, such as a user of computing device 202. By registering the compliance check, users may indicate their belief that the compliance check is beneficial or desirable. In some examples, users at a particular group may wish to register the compliance check even if they do not wish to currently activate the compliance check. For example, users may temporarily disable a beneficial compliance check in order to test a new or alternative compliance check. This disclosure contemplates systems in which, even when users disable a beneficial compliance check, the users may still register the compliance check with system 100 so that other users, at other groups, may benefit from the use of the check in system 100.

FIG. 4 illustrates an example of the compliance standard and compliance check information that may be maintained in database 120. As shown in FIG. 4, three group computers may be included within system 100: a financial group computer 401, a medical group computer 403, and an order processing group computer 405. These computers may be examples of computing device 202. In this example, financial group computer 401 may include three registered compliance standards: a first security standard 410, a SOX standard 412, and a first network optimization standard 414. First security standard 410 may be a first compliance standard for enhancing the security of financial group computer 401. First security standard 410 may include two compliance checks: an encryption check 420 and a weak passwords check 422. Encryption check 420 may check to ensure that certain sensitive data is encrypted in financial group computer 401. Weak passwords check 422 may check to ensure that passwords used in financial group computer 401 are not too weak to present a security risk.

SOX standard 412 may include two compliance checks: an audit check 424 and a reporting control check 426. Audit check 424 may check to ensure that an accurate record of security events is recorded. Security events may include unsuccessful log-in attempts and the granting or removal of privileged access. Reporting control check 426 may check to ensure that information about the organization including the financial group is reported to company officers, in compliance with the SOX Act.

First network optimization standard 414 may include two compliance checks: a protocol optimization check 428 and a compression check 430. Protocol optimization check 428 may check to ensure that an optimal network protocol is used at financial group computer 401. Compression check 430 may check to ensure that data is being compressed for transmission to and/or from financial group computer 401. The compliance checks in first network optimization standard 414 may help to ensure that financial group computer 401 communicates with the network in an efficient manner.

Medical group computer 403 may include three compliance standards: second security standard 436, HIPAA standard 438, and second network optimization standard 440. Second security standard 436 may include four compliance checks: encryption check 420, weak passwords check 422, malware block check 442, and security patch check 444. Thus, encryption check 420 and weak passwords check 422 may be included in both financial group computer 401 and medical group computer 403. Malware block check 442 may check to ensure that certain malware is not present or active on medical group computer 403. Security patch check 444 may check to ensure that an up-to-date security patch is installed at medical group computer 403.

HIPAA standard 438 may include two compliance checks: an unauthorized edit check 446 and a data corroboration check 448. Unauthorized edit check 446 may check to ensure that only authorized users may edit or delete data on medical group computer 403. Data corroboration check 448 may check to ensure the integrity of files on medical group computer 403. For example, data corroboration check 448 may use check sum, double-keying, message authentication, and/or digital signature methods to ensure the integrity of files.

Second network optimization standard 440 may include two compliance checks: protocol optimization check 428 (as in financial group computer 401) and a quality of service check 450. Quality of service check 450 may check to ensure that a quality of service tool is active at medical group computer 403.

Order processing group computer 405 may include three compliance standards: a third security standard 452, a PCI standard 454, and first networking optimization standard 414 (as in financial group computer 401). Third security standard 452 may include three compliance checks: encryption check 420 (as in financial group computer 401), security patch check 444 (as in medical group computer 403), and a firewall check 458. Firewall check 458 may check to ensure that a firewall is active at order processing group computer 405.

PCI standard 454 may include two compliance checks: firewall check 458 and an anti-virus check 460. Anti-virus check 460 may check to ensure that an anti-virus program is active at order processing computer 405. Firewall check 458 and anti-virus check 460 may help to satisfy the PCI DSS, which requires firewall and anti-virus protection.

Financial group computer 401, medical group computers 403, and order processing group computer 405 may be connected to server 206 through a network. These computers may be considered client computers. Maintenance module 104 may maintain a group of compliance standards, including at least some of the compliance standards at the client computers in FIG. 4, by storing information about the compliance standards in database 120. The information may include a snapshot of the compliance standard and compliance check information, as discussed above.

FIG. 5 shows an exemplary Graphical User Interface (GUI) 500 for accessing system 100. GUI 500 includes two main information panels: a top panel 520 and a bottom panel 530. Top panel 520 includes a table of information about compliance standards and checks registered with system 100. The table includes a compliance check column 502, a compliance standard column 504, a prevalence column 506, a source column 508, an efficacy column 510, a scope column 512, and a score column 514.

Compliance check column 502 may list compliance checks registered with system 100, including the thirteen compliance checks shown in FIG. 4. The checks may be sorted and/or reordered according to a variety of criteria, including a reputation score, as discussed more below. Sort buttons in the top right corner of column headings, such as sort button 552 in the top right corner of prevalence column 506, may allow a user to sort the data in top panel 520 based on an ordering of the data under that column.

Compliance standard column 504 may list the compliance standards that include the compliance check of the corresponding row. For example, encryption check 420 is included in three compliance standards: the first, second, and third security standards. Accordingly, those three standards may be shown in the corresponding position under the compliance standard column for the row including encryption check 420.

Prevalence column 506 may include information about the prevalence of the corresponding compliance check. For example, prevalence column 506 may include a prevalence score that indicates how prevalent the compliance check is among the compliance standards registered with system 100.

The prevalence score may be calculated in a variety of manners. For example, the prevalence score may be calculated on a standard-proportion basis as the proportion of compliance standards including the corresponding compliance check. In the example of FIG. 4, encryption check 420 is included within three of the eight compliance standards registered with system 100, and therefore may have a prevalence score of 37.5% (⅜). Alternatively, the prevalence score may be calculated on an instance-proportion basis as the proportion of instances of registered compliance standards that include the compliance check. For example, as shown in FIG. 4, protocol optimization check 428 may be included within two instances of the first network optimization standard. Thus, the calculation of the prevalence score for the protocol optimization check 428 may include increasing the score for each of the two registered instances. The prevalence score may also be calculated on a device-proportion basis as the proportion of devices that include the compliance check. For example, order processing group computer 405 includes the same firewall check 458 in both its third security standard 452 and PCI standard 454. Accordingly, on the Device-Proportion basis, the prevalence score for the firewall check 458 may be calculated based on its inclusion in order processing computer 405, without regard to how many compliance standards at that device include the firewall check 458. The prevalence score may also be calculated in many other ways, including those that are only based on, or only correlate with, one or more of the above-mentioned standard-proportion, instance-proportion, and device-proportion methods. The magnitude of the score may be proportional to the magnitude of the prevalence (e.g., frequency of the compliance check). In general, the prevalence score may be calculated to reflect the absolute or relative prevalence of the compliance check among a group of compliance standards or devices including those standards.

Bottom panel 530 in FIG. 5 includes a map 532 showing the prevalence of a selected compliance check. Compliance checks may be selected in any number of ways in GUI 500, including clicking a mouse pointer on the compliance check listed under compliance check column 502 or simply hovering the mouse pointer over the compliance check.

Bottom panel 530 also includes prevalence options panel 534, including standard-proportion button 536, instance-proportion button 538, and device-proportion button 540. GUI 500 allows a user to toggle between these methods for calculating the prevalence score by selecting one of the buttons 536, 538, and 540. Upon selecting one of the methods for calculating the prevalence score, the GUI 500 may update the scores shown in prevalence column 506. The user may also toggle the display of the prevalence options panel on and off by selecting the prevalence options toggle 542 shown at the top of prevalence column 506.

Source column 508 may include information regarding the source of the corresponding compliance check, including information about the reputation of the source. For example, as shown in FIG. 5, encryption check 420 derives from the source of MICROSOFT. MICROSOFT may be largely regarded as a trusted source, and so encryption check 420 also corresponds to a source reputation score of 95% under the source column. In contrast, weak passwords check 422 derives from the source 128.98.343.231, which is unknown and not trusted. Accordingly, weak passwords check 422 receives a source reputation score of only 30%. Compliance checks may also derive from internal sources. For example, the "Audit" check may derive from the financial group, which is internal to the organization having the network shown in FIG. 4. Internal sources may be highly trusted, and so the "Audit" check may receive a source reputation score of 98%.

As with the prevalence options toggle 542, the user may select a source options toggle 544 to display a source options panel 546 within bottom panel 530. Source options panel 546 may display further details about the source of the corresponding compliance check, including a history or graph of reported incidents related to the source. Source options panel 546 may also present a variety of options for calculating the reputation score for the source. For example, the source reputation may be calculated based on one or more of user reviews of the source and a history of reported incidents related to the source.

Efficacy column 510 may include an efficacy score for the corresponding compliance check in the table in top panel 520. The efficacy score may describe how well the particular compliance check performs along one or more performance measures. For example, the efficacy score may be based on the absolute or relative number of incidents that are reported on devices that include the compliance check. The relative number of reported incidents may be based on a comparison between the number of reported incidents for the particular compliance check and the number of reported incidents for other compliance checks. The efficacy score may also be based on user reviews of the compliance check.

FIG. 6 shows an exemplary version of GUI 500 in which bottom panel 530 has switched to show an efficacy options panel 602. Efficacy options panel 602 may be displayed when the user selects the efficacy of a particular compliance check, such as by clicking on the efficacy score or by hovering the mouse pointer over the efficacy score or the header of efficacy column 510.

Efficacy options panel 602 may include a test selection toggle 606. Test selection toggle 606 may include a drop-down menu that allows the user to select one or more tests for computing the efficacy score. These tests may include a test based on user reviews of the compliance check and tests based on a number of reported incidents related to devices where the compliance check is active. The disclosed subject matter is not limited to those tests, however, and any test that describes the absolute or relative efficacy of the compliance check along a performance measure may be included and selected in test selection toggle 606. When the user selects one or more of the tests using test selection toggle 606, the efficacy scores under efficacy column 510 may be updated based on the newly-selected test or tests.

Efficacy options panel 602 may also include graph introduction 612. Graph introduction 612 may introduce the user to the graph 614 of how many reports have been filed on devices that include the compliance check within the past six months. In FIG. 6, twelve separate reports have been filed on devices that include the selected compliance check.

Returning to FIG. 5, top panel 520 may also include a scope column 512. Scope column 512 may include indications of a scope of the compliance standard for the corresponding compliance check. A scope of a compliance standard may describe the software/hardware on which the compliance check may operate and/or the goal to which the compliance check is directed. One example of compliance standards having common scope may be compliance standards applying to a common platform. Two or more compliance standards may be considered to apply to a common platform if, for example, they apply to a common software or hardware platform. For example, compliance checks that apply to WINDOWS 7 computers may apply to a common platform. Likewise, compliance checks that apply to MICROSOFT X-BOX consoles may apply to a common platform. A scope may also be user-defined or may be inferred by maintenance module 104 based on an analysis of the compliance check.

Scopes may function substantially the same way that "tags" do in other software applications, such as email and document archiving applications. For example, a user may assign a tag to a compliance standard, indicating a particular scope for the compliance standard. In accordance with "tagging" software, the user may assign multiple tags to the same scope. The user may then identify, search for, or limit prevalence score, source reputation score, efficacy score, or reputation score comparisons and/or calculations to those with the same or similar scope.

Maintenance module 104 may consider two compliance standards to have common scope when they include at least one identical scope. For example, second security standard 436 has a scope of WINDOWS machines. Thus, second security standard 436 may only execute on WINDOWS software platforms. HIPAA standard 438 also has a scope of WINDOWS software platforms. Thus, maintenance module 104 may consider second security standard 436 and HIPAA standard 438 to have common scope.

The scope information stored in database 120 of system 100 may also be hierarchical. For example, third security standard 452 may have a scope of WINDOWS 7 machines. WINDOWS 7 is an example of WINDOWS software platforms. Thus, maintenance module 104 may consider third security standard 452 to have common scope with second security standard 436, which has a scope of WINDOWS software platforms. The use of hierarchical information will be discussed more below regarding the calculation of the reputation score.

Similarly, a scope may represent a desired goal or context for the compliance standard. For example, first security standard 410 may represent the desired goal of security. Accordingly, first security standard 410 may also include security as a scope under scope column 512.

Because compliance standards may have multiple scopes, each item under the scope column 512 may include a drop-down button 548. When the drop-down button 548 is not toggled, each item may only display a subset of the scopes for the particular compliance standard, such as a single scope. When the user toggles the drop-down button 548, a complete list of the scopes for the compliance standard may be displayed.

Returning to FIG. 3, at step 304 one or more of the systems described herein may calculate a reputation score for at least one compliance check within the group of compliance standards. For example, scoring module 106 may calculate a reputation score for at least one compliance check from the compliance checks shown in FIG. 4.

The reputation score for the compliance check may be calculated in a variety of manners. For example, scoring module 106 may calculate the compliance check based on one or more of the prevalence scores in prevalence column 506, the source reputation scores in source column 508, and the efficacy scores in efficacy column 510.

Each of the prevalence scores, the source reputation scores, the efficacy scores, and the reputation scores may be displayed as percentages, as in FIG. 5. However, the disclosed subject matter is not limited to the use of percentages for scoring. Rather, scoring module 106 may use any form of numbers or lettering, or any other symbols (e.g., simple colors) to indicate the scores. For example, scoring module 106 may use a simple lettering system, as in school report cards, to give As to higher scores, Cs to mediocre scores, and Fs to failing scores, etc. Also, there is no requirement that the score increase with its corresponding value (e.g., prevalence, source reputation, efficacy, or reputation). Rather, the relationship may be inverted. The relationship may also be nonlinear or heavily weighted at one end of the scoring spectrum. In general, any method may be used for conveying the scores, as long as different score outputs distinguish for users between different estimated qualities or reputations of a compliance check.

FIG. 7 shows a version of GUI 500 where the bottom panel 530 has switched to display edit score options 702. Edit score options 702 may allow a user to select a variety of manners for calculating the reputation score for a particular compliance check. These options may include a user-defined formula option 704, a weighted formula option 706, and a pre-defined formula option 708. Edit score options 702 may be displayed whenever the user selects a reputation score for a compliance check or selects the heading of score column 514, such as by clicking or hovering with the mouse.

User-defined formula option 704 may allow the user to define a precise mathematical formula for calculating the reputation score in terms of prevalence, source, and efficacy. As indicated by text portion 710, the user may use the terms "P", "S", and "E", for the prevalence score, source reputation score, and efficacy score, respectively, to define a mathematical formula for the reputation score for the compliance check. For example, the user could define the reputation score as "2P+S", "0.95E", or "(P+0.5S)/E".

As indicated by text portion 712, weighted formula option 706 may allow a user to simply increment or decrement weights for one or more of the prevalence score, source reputation score, and efficacy score. Scoring module 106 may then apply the weights to each corresponding value and calculate the sum as the reputation score for the compliance check.

As another option, and as indicated by text portion 714, pre-defined formula option 708 may allow a user to select a pre-defined formula for calculating the reputation score of the compliance check from a drop down menu 716 or by browsing for the pre-defined formula using browse button 718.

When a user selects a formula for calculating the reputation score for the compliance check, the reputation scores under score column 514 may be updated to display the scores based on the newly-selected formula.

Returning to FIG. 5, the calculation of the reputation score for the compliance check may also be limited to the scope of a corresponding compliance standard. For example, each indication of scope under scope column 512 may include a scope limiting button 550. By toggling the scope limiting button 550, the comparison of the compliance check with compliance checks in other compliance standards, in calculating the reputation score for the compliance check, may be limited to comparing the compliance check with only those compliance checks in compliance standards having the same or similar scope.

For example, when the user toggles the scope limiting button 550 next to the scope "WINDOWS" for second security standard 436, then the reputation score for the selected compliance check within first security standard 410 may be calculated based on comparisons that are limited to comparisons with compliance standards that have the same and similar scope as WINDOWS software platforms. In the example of FIG. 5, these compliance standards may include HIPAA standard 438, which also has a scope of WINDOWS software platforms. Thus, scoring module 106 may calculate the prevalence score for the compliance check based on how prevalent the compliance check is among only those compliance standards that have a scope of WINDOWS software platforms. The calculations of relative source reputation scores and relative efficacy scores may also be limited by scope in this manner to comparisons with compliance standards having the same or similar scope.

Scoring module 106 may also limit the comparison of compliance checks with compliance standards based on the hierarchical information regarding scope in database 120. For example, WINDOWS 7 is an example of WINDOWS software platforms. Thus, when the user toggles the scope limiting button 550 next to "WINDOWS", scoring module 106 may limit the calculation of the reputation score for a particular compliance check to a comparison with compliance standards having scope WINDOWS software platforms and compliance standards having scope "WINDOWS 7", because WINDOWS 7 is included within WINDOWS software platforms. Thus, when the user toggles the scope limiting button 550 next to second security standard 436, then system 100 may automatically toggle the scope limiting buttons 550 next to HIPAA standard 438, which has scope "WINDOWS" and third security standard 452, which has scope "WINDOWS 7". But, considering the hierarchical information, the reverse operation may not be performed: when the user toggles the scope limiting button 550 next to third security standard 452 having scope "WINDOWS 7", other compliance standards having only the generic scope "WINDOWS software platforms" may not be selected, because they are not included within WINDOWS 7. Alternatively, the compliance standards having scope "WINDOWS software platforms" may also be selected, because they have scope that is at least similar to WINDOWS 7.

Further, compliance standards may have multiple scopes. In FIG. 5, due to space constraints, only a single scope is displayed for each compliance standard. For example, first security standard 410 has scope "Security." However, first security standard may have multiple scopes, including relevant software or hardware platforms to which the standard is directed (e.g., those platforms that are the only platforms where the standard is operable or applicable). In GUI 500, a user may display multiple scopes for the same compliance standard by selecting a drop down button, such as drop down button 548, in the bottom left corner of each scope item.

Returning to FIG. 3, at step 306 one or more of the systems described herein may assign the reputation score to the compliance check. For example, after calculating the reputation score for the compliance check, scoring module 106 may store the reputation score in the score portion 134 within database 120. Scoring module 106 may also, or alternatively, store the reputation score within any data structure that associates or correlates the reputation score with its corresponding compliance check.

At step 308, one or more of the systems described herein may provide a recommendation for whether to implement the compliance check based at least in part on the reputation score assigned to the compliance check. For example, recommendation module 108 may provide a recommendation for whether to implement the compliance check.

Recommendation module 108 may provide the recommendation in a variety of manners. In some embodiments, recommendation module 108 may provide the recommendation by simply displaying the reputation scores for the compliance checks. For example, recommendation module 108 may display the reputation scores for the compliance checks under score column 514 in GUI 500. Alternatively, or in addition, recommendation module 108 may analyze one or more of the following items of information and highlight or suggest compliance checks to be implemented based on the analysis: compliance checks that are already active at the user's computing device, the scope of compliance standards that are active at the user's computing device, the user's estimated thresholds for prevalence, source reputation, efficacy, and/or reputation scores of registered compliance checks, the user's previous interaction with system 100, compliance standards that are already included within a currently included panel for registering additional compliance standards (as discussed more below regarding FIG. 8), profile information about the user, and profile information about the group in which the user in included, etc. In general, recommendation module 108 may use any method of calculation, including any variety of artificial intelligence, to estimate which compliance checks might be desirable or beneficial to a user, and to recommend those compliance checks to the user, based on any information that the recommendation module 108 has access to about the user and the compliance checks available. After step 308, exemplary method 300 in FIG. 3 may end.

System 100 may also allow users to register additional compliance standards. FIG. 8 shows a version of GUI 500 in which a compliance standard addition panel 802 is displayed in bottom panel 530 for registering an additional compliance standard. The compliance standard addition panel 802 may be displayed to a user of a computing device, such as the computing devices shown in FIG. 4.

As shown in FIG. 8, a currently included checks panel 804 may display a list of all of the compliance checks currently included in the candidate compliance standard to be added. As indicated by a text portion 803, the user may set up a new compliance standard, called the fourth security standard. In FIG. 8, only a new compliance check, intrusion detection check 806, is listed in currently included checks panel 804 for the fourth security standard. The new compliance check may have been newly registered with system 100 by a user. As indicated by a text portion 808, a user may add a compliance check to the candidate compliance standard by selecting one of the compliance checks listed in compliance check column 502. For example, the user may select one of the compliance checks by clicking on the compliance check with a pointing device or by dragging and dropping the compliance check into currently included checks panel 804. Alternatively, as indicated by text portion 808, the user may select an additional compliance check using a browse button 810.

After the user has added all of the desired compliance checks to the currently included checks panel 804, the user may select the OK button 812 to register the new compliance standard, such as the fourth security standard, with system 100. The new compliance standard may then be stored in the compliance standards portion 122 of database 120.

Figure 9:
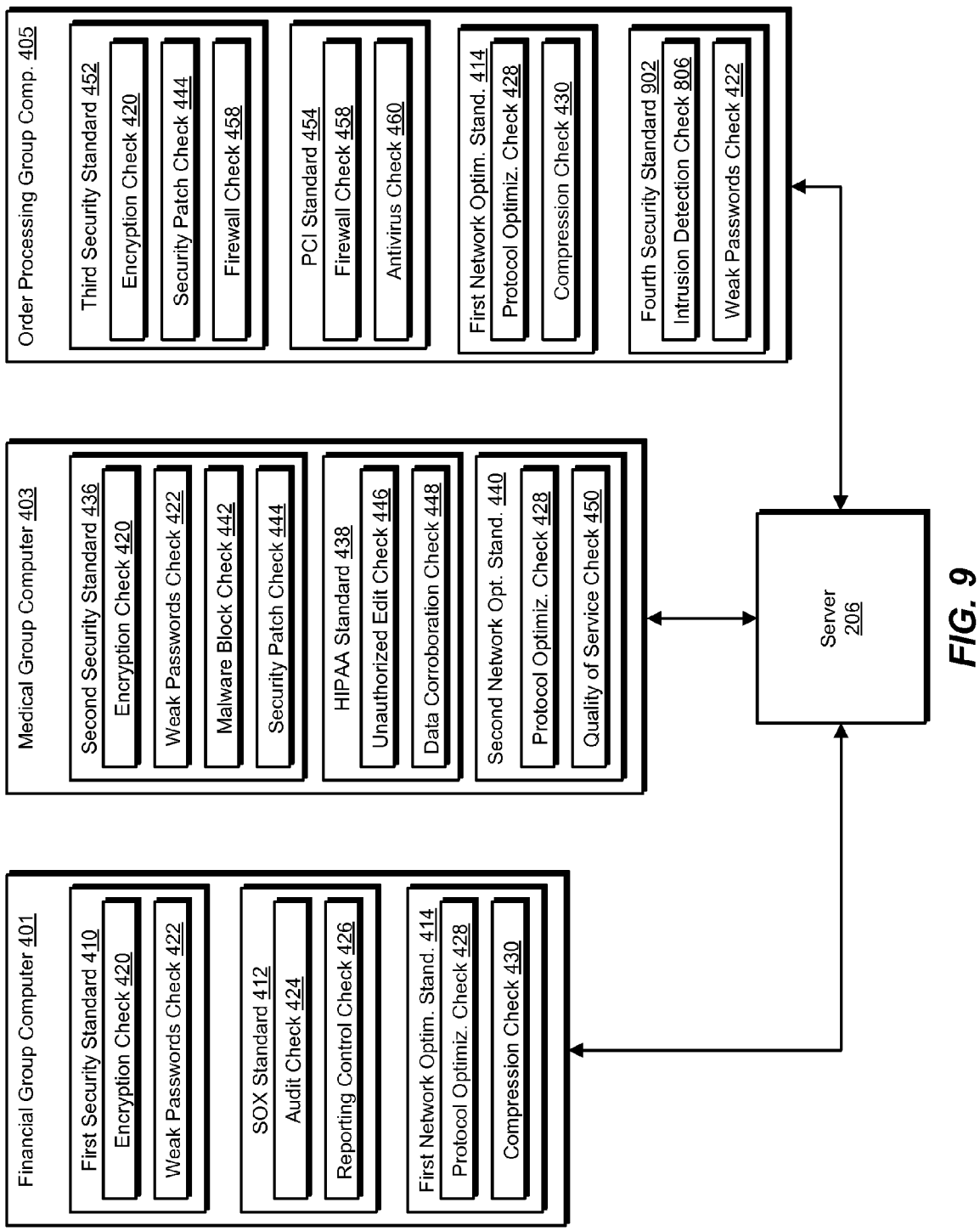
FIG. 9 is an updated block diagram of the network devices in FIG. 4, after the addition of a compliance check.

FIG. 9 shows the same group of computing devices 401, 403, and 405 from FIG. 4 after the addition of the fourth security standard (labeled 902 in FIG. 9). Fourth security standard 902 was associated with order processing group computer 405. Fourth security standards 902 may have been associated with order processing group computer 405 by a user of order processing group computer 405 or by a user of a another computing device, such as computing devices 401 and 403, for example if the user had authorization to associate compliance standards with order processing group computer 405. As shown in FIG. 9, fourth security standard 902 may include intrusion detection check 806 discussed above regarding FIG. 8. As also shown in FIG. 9, fourth security standard 902 further includes weak passwords check 422. Thus, the user may have added weak passwords check 422 to fourth security standard 902 by dragging and dropping the weak passwords check 422 from compliance check column 502 in FIG. 8 to the currently included checks panel 804 in FIG. 8. The other elements in FIG. 9 remain the same as in FIG. 4.

FIG. 10 shows top panel 520 in GUI 500 updated after the addition of fourth security standard 902 to compliance standards portion 122 of database 120. Thus, check column 502 now includes the new compliance check, intrusion detection check 806. Further, the prevalence scores under prevalence column 506 have been updated based on the addition of fourth security standard 902. For example, weak passwords check 422 may now be included in an additional compliance standard, fourth security standard 902, and therefore its prevalence score has increased to 33.3%. Notice, also, that the reputation scores for all of the checks have been updated based on the updated prevalence scores.

Figure 11:
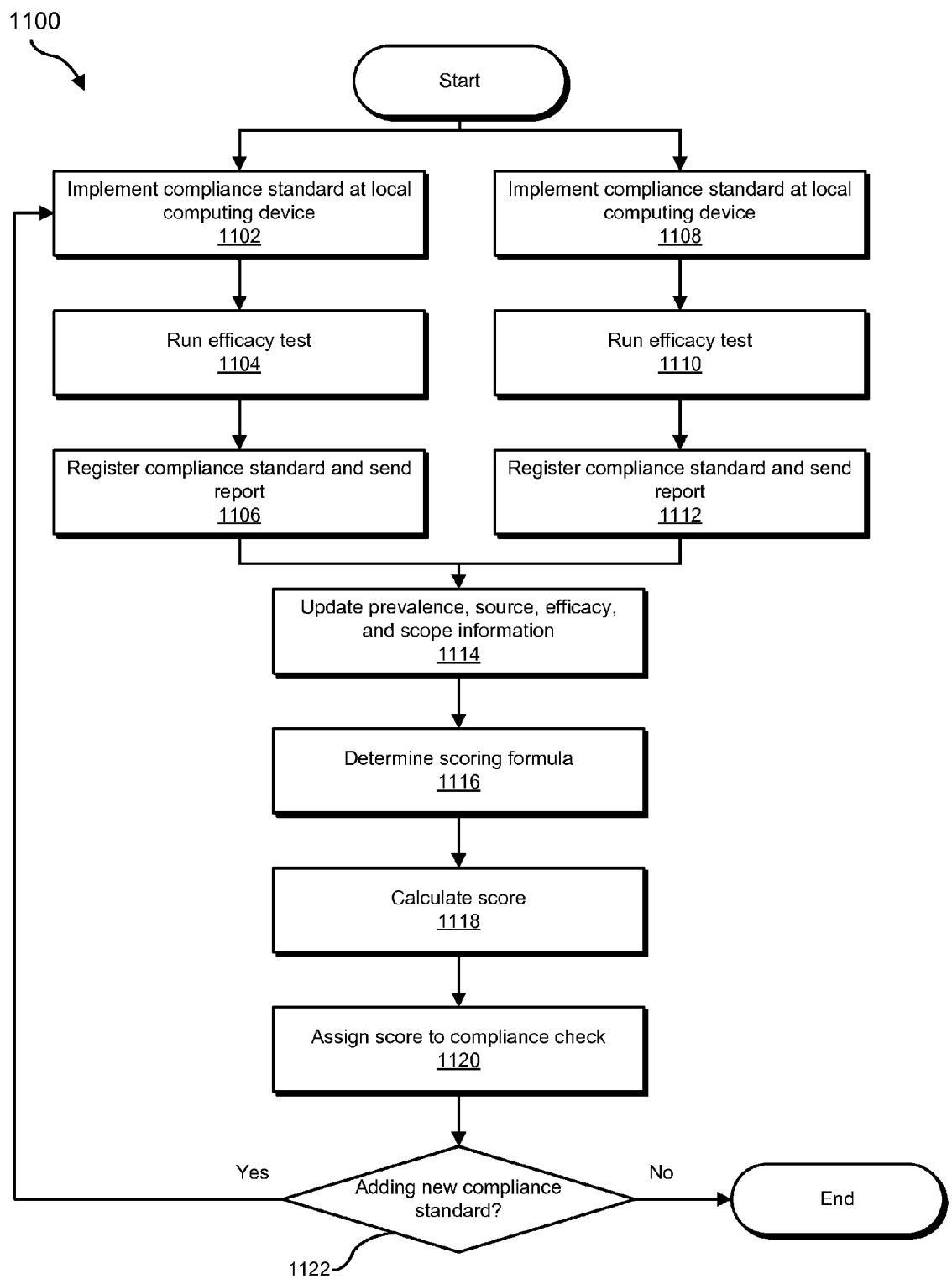
FIG. 11 is a flow diagram of an exemplary method for evaluating compliance checks.

FIG. 11 is a flow diagram of an additional exemplary computer-implemented method 1100 for evaluating compliance checks. Two separate branches of method 1100 (represented by steps 1102, 1104, 1106, and steps 1108, 1110, and 1112) show how two users, such as a user at financial group computer 401 and a user at medical group computer 403, can independently contribute to system 100 for evaluating compliance checks.

At steps 1102 and 1108, a user may implement a compliance standard at a local computing device. Then, at steps 1104 and 1110, an efficacy test for evaluating the efficacy of the compliance standard may be run at the local computing device. The efficacy test may be selected using a graphical user interface similar to efficacy options panel 602 shown in FIG. 6.

From steps 1104 and 1110, method 1100 may proceed to steps 1106 and 1112, where the method may further include registering the respective compliance standard with system 100. Registering the respective compliance standard may include storing data about the compliance standard in the compliance standards portion 122 of database 120. Registering the respective compliance standard may also include transmitting details of the compliance standards and their compliance checks, including details of the results of the efficacy test performed at steps 1104 and 1110, to server 206.

From both steps 1106 and 1112, method 1100 may proceed to step 1114, where server 206 may receive and update one or more of prevalence, source, efficacy, and scope information for its registered compliance checks. Server 206 may then organize that information in database 120.

From step 1114, method 1100 may proceed to step 1116, where scoring module 106 may determine the scoring formula for calculating the reputation score for a compliance check. The scoring formula may be determined using a graphical user interface similar to edit score options 702 shown in FIG. 7.

From step 1116, method 1100 may proceed to step 1118, where scoring module 106 may calculate the reputation score for the compliance check using the scoring formula determined at step 1116. Calculating the reputation score may be performed substantially the same as at step 304 of FIG. 3.

From step 1118, method 1100 may proceed to step 1120, where scoring module 106 may assign the reputation score calculated at step 1118 to the compliance check. Assigning the reputation score may be performed substantially the same as at step 306 of FIG. 3.

From step 1120, method 1100 may proceeding to step 1122, where a determination may be made as to whether another compliance standard is to be registered in system 100. The determination of whether another compliance standard is to be registered may be based on interactions with a graphical user interface such as compliance standard addition panel 802 in FIG. 8. If the determination is affirmative at step 1122, then method 1100 may return to step 1102 (or step 1108). After returning to step 1102, all or part of the method may repeat using the particular compliance standard that was determined to be added at step 1122. Upon reaching step 1118 again, scoring module may calculate a reputation score for the compliance standard from step 1122. At step 1118, scoring module may also update reputation scores for one or more other compliance standards registered with system 100. The updating of the one or more other reputation scores may be substantially the same as the updating shown in FIG. 10, as discussed above. If the determination is negative at step 1122, then method 1100 may end.

Figure 12:
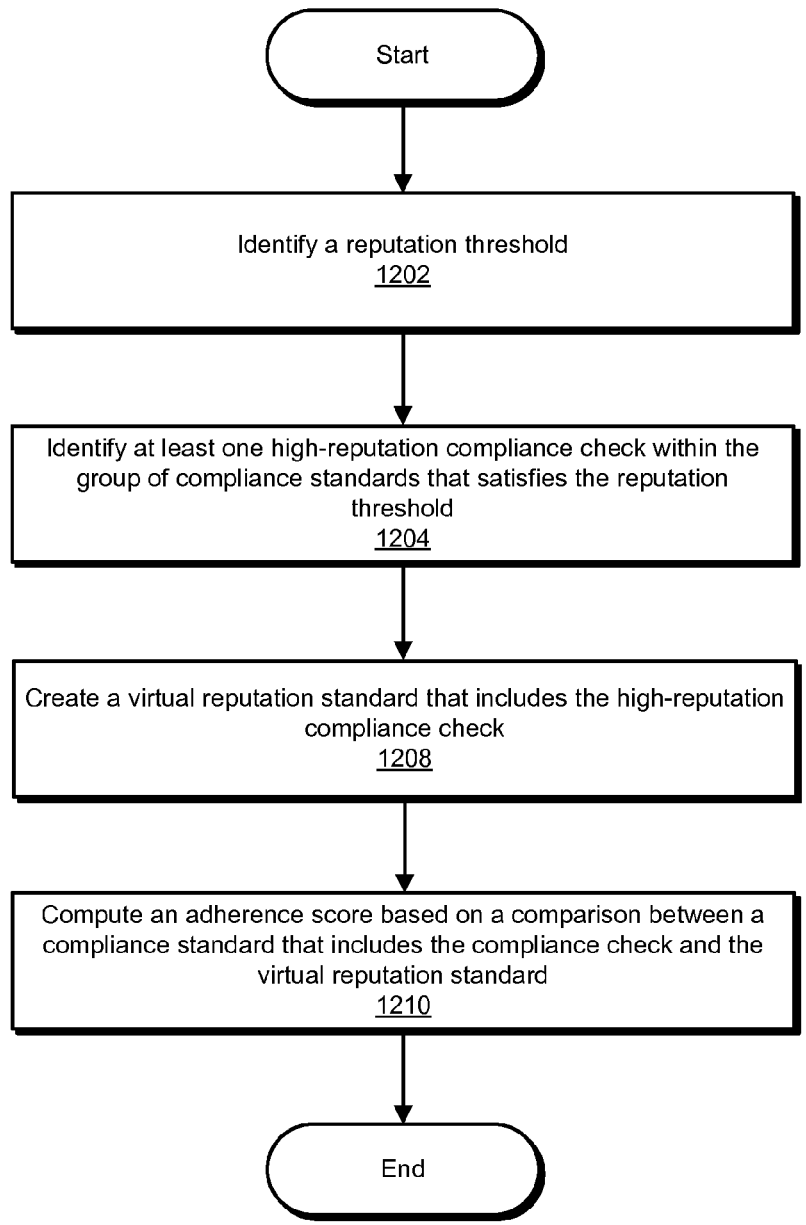
FIG. 12 is a flow diagram of an exemplary method for evaluating compliance checks.

FIG. 12 is a flow diagram of an exemplary computer-implemented method 1200 for evaluating compliance checks. Methods 300 and 1100 may further include method 1200. Method 1200 is directed to computing an adherence score based on a comparison with a virtual reputation standard, as discussed below.

At step 1202, one or more of the systems described herein may identify a reputation threshold. For example, a virtual reputation module in system 100 may receive through a graphical user interface user input indicating a reputation threshold. Alternatively, the virtual reputation module may automatically compute a reputation threshold based on one or more factors including default settings and user preferences.

Figure 13:
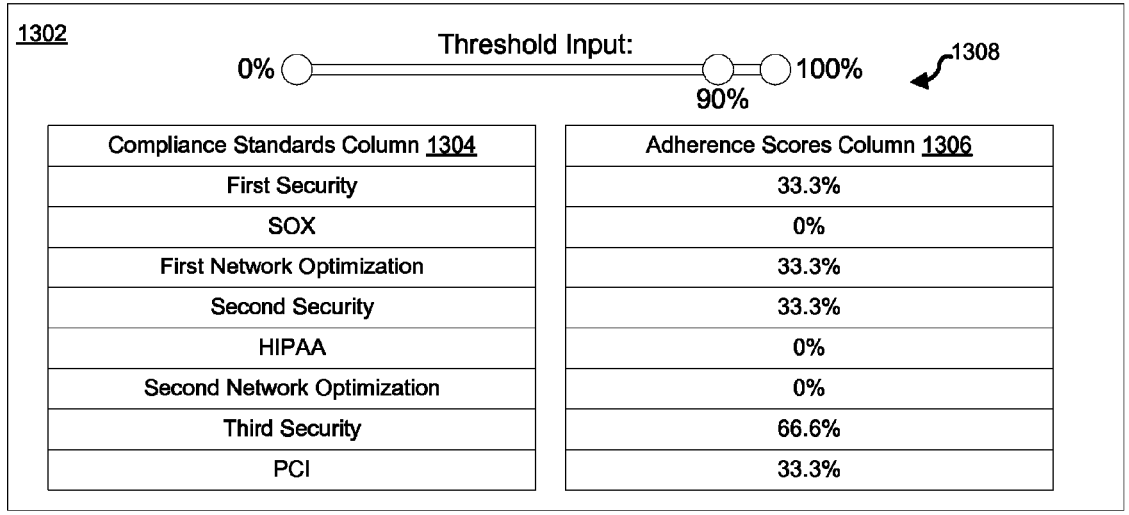
FIG. 13 is a graphical user interface implementing an exemplary method for evaluating compliance checks.

FIG. 13 shows graphical user interface 500 in which the bottom panel 530 has switched to a virtual reputation standard panel 1302. Virtual reputation standard panel 1302 includes a compliance standards column 1304 and an adherence scores column 1306. Virtual reputation standard panel 1302 may also include a threshold input 1308 for inputting a reputation threshold.

Threshold input 1308 may allow a user to select a value along a range of reputation scores. For example, if the reputation scores under score column 514 are displayed in a percentage format, as in FIG. 13, then threshold input 1308 may allow a user to select a value from a range of percentage scores (e.g., 0-100%). If the reputation scores under score column 514 are displayed in a school grade format, then threshold input 1308 may allow a user to select a value from a range of school grades (e.g., A+, B−, C, etc.). Threshold input 1308 may allow a user to simply type a reputation threshold, or to select a reputation threshold along a sliding scale, as in FIG. 13.

Returning to FIG. 12, at step 1204, after identifying a reputation threshold at step 1202, one or more of the systems described herein may identify at least one high-reputation compliance check within the group of compliance standards that satisfies the reputation threshold. For example, the virtual reputation module in system 100 may identify all of the compliance checks registered in database 120 having reputation scores above (or equal to) the reputation threshold identified at step 1202. The virtual reputation module may then highlight the display of those high-reputation compliance checks in top panel 520, or otherwise display an indication of which high-reputation compliance checks satisfy the reputation threshold.

As with the calculation of the reputation score at step 304 of FIG. 3, the identifying of the high-reputation compliance checks at step 1204 may also be limited to a particular scope, such as the scopes listed under scope column 512. Thus, when a user toggles a scope limiting button 550, then, when identifying high-reputation compliance checks, the virtual reputation module may only select those compliance checks that both satisfy the reputation threshold and share a same or similar scope as the toggled scope.

After step 1204, method 1200 may proceed to step 1208, where one or more of the systems described herein may create a virtual reputation standard that includes the high-reputation compliance check. For example, the virtual reputation module may create the virtual reputation standard by selecting, highlighting, or otherwise indicating the compliance checks that satisfy the reputation threshold. Creating the virtual reputation standard at step 1208 may further include storing an indication of which compliance standards satisfy the reputation threshold (and other requirements such as scope requirements) as the virtual reputation standard in a virtual reputation portion of database 120.

After step 1208, method 1200 may proceed to step 1210, where one or more of the systems described herein may compute an adherence score based on a comparison between a compliance standard that includes the compliance check and the virtual reputation standard. For example, scoring module 106 may compute the adherence score based on a comparison between a compliance standard and the virtual reputation standard created at step 1208.

Scoring module 106 may compute the adherence score in a variety of ways. For example, scoring module 106 may compute the adherence score based on the percentage of compliance checks in the virtual reputation standard that are included in the compliance standard that include the compliance check (e.g., the compliance check from step 304 of FIG. 3). Scoring module 106 may also compute the adherence score based on the reverse comparison: the percentage of compliance checks in the particular compliance standard that are included in the virtual reputation standard. Scoring module 106 may compute the adherence score based on either or both of the omission and the inclusion of high reputation compliance checks from the virtual reputation standard within the particular compliance standard.

In the example of FIG. 13, the adherence score is calculated as the percentages of compliance checks from the virtual reputation standard that are included within the particular compliance standard. Therefore, the following compliance standards receive an adherence score of 33.3%, because each of them contains one of the three registered compliance checks having reputation scores over 90%: first security standard 410, first network optimization standard 414, second security standard 436, and PCI standard 454. Further, the following compliance standards receive an adherence score of 0%, because each of them does not contain a single compliance check having a reputation score over 90%: SOX standard 412, HIPAA standard 438, and second network optimization standard 440. Lastly, third security standard 452 receives an adherence score of 66.6%, because that standard contains two of the three registered compliance checks having reputation scores over 90%.

As explained above, by aggregating information about activated and/or registered compliance standards from multiple sources, the systems described herein may report that information, and/or analyses of that information, to aid users in adopting, registering, modifying, or otherwise managing compliance standards. In particular, these systems may recommend compliance checks with high reputation scores to users for activation at a device associated with the user (or another device).

Figure 14:
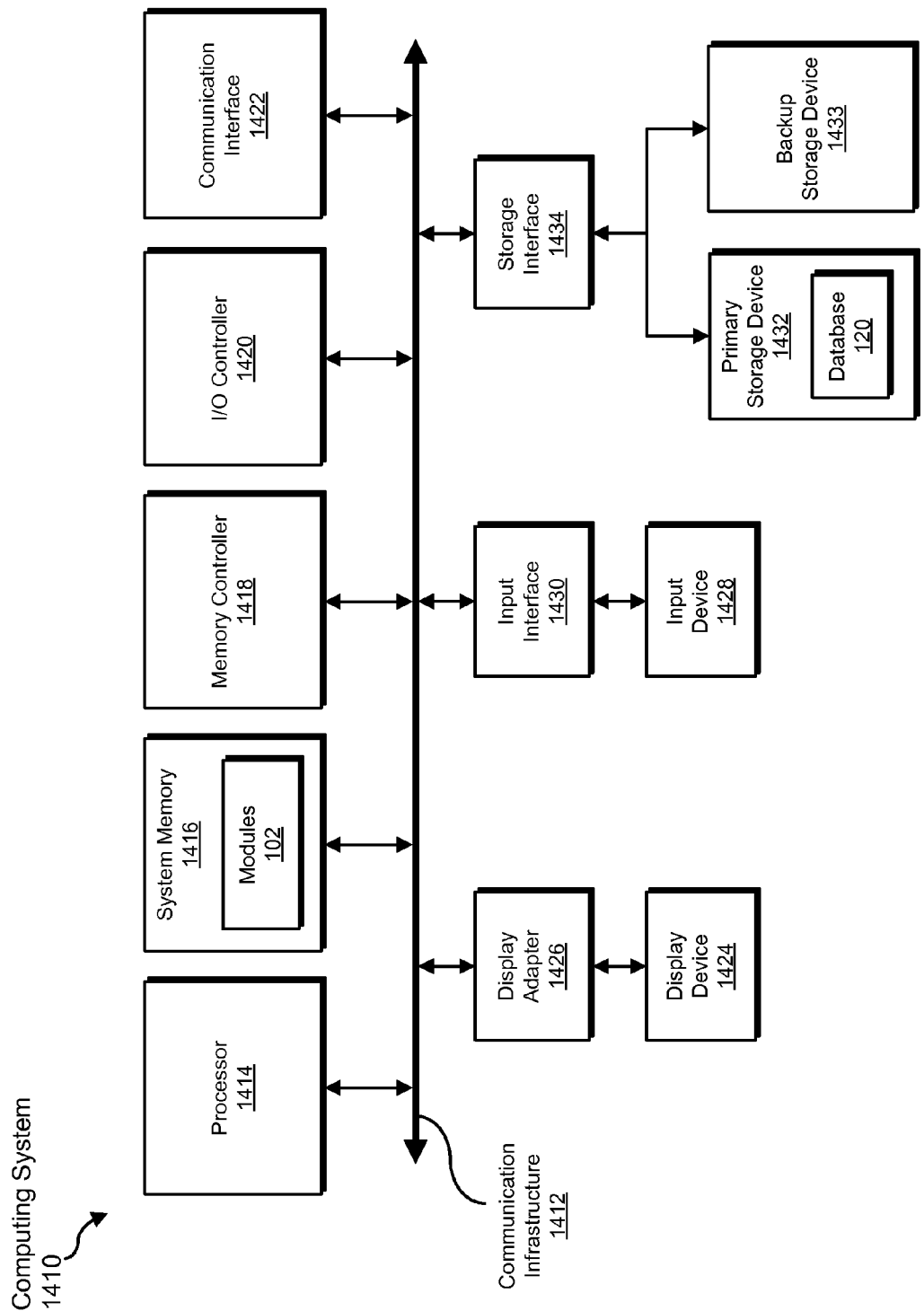
FIG. 14 is a block diagram of an exemplary computing system capable of implementing one or more of the embodiments described and/or illustrated herein.

FIG. 14 is a block diagram of an exemplary computing system 1410 capable of implementing one or more of the embodiments described and/or illustrated herein. Computing system 1410 broadly represents any single or multi-processor computing device or system capable of executing computer-readable instructions. Examples of computing system 1410 include, without limitation, workstations, laptops, client-side terminals, servers, distributed computing systems, handheld devices, or any other computing system or device. In its most basic configuration, computing system 1410 may include at least one processor 1414 and a system memory 1416.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the exemplary embodiments described and/or illustrated herein. For example, processor 1414 may perform and/or be a means for performing, either alone or in combination with other elements, one or more of the maintaining, calculating, assigning, providing, obtaining, storing, recommending, adding, updating, identifying, creating, and/or computing steps described herein. Processor 1414 may also perform and/or be a means for performing any other steps, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, one or more of modules 102 from FIG. 1 may be loaded into system memory 1416.

In certain embodiments, exemplary computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an ISA, PCI, PCIe, or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the steps or features described and/or illustrated herein, such as maintaining, calculating, assigning, providing, obtaining, storing, recommending, adding, updating, identifying, creating, and/or computing.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434. I/O controller 1420 may be used, for example, to perform and/or be a means for performing, either alone or in combination with other elements, one or more of the maintaining, calculating, assigning, providing, obtaining, storing, recommending, adding, updating, identifying, creating, and/or computing steps described herein. I/O controller 1420 may also be used to perform and/or be a means for performing other steps and features set forth in the instant disclosure.

Communication interface 1422 broadly represents any type or form of communication device or adapter capable of facilitating communication between exemplary computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution. In certain embodiments, communication interface 1422 may perform and/or be a means for performing, either alone or in combination with other elements, one or more of the maintaining, calculating, assigning, providing, obtaining, storing, recommending, adding, updating, identifying, creating, and/or computing steps disclosed herein. Communication interface 1422 may also be used to perform and/or be a means for performing other steps and features set forth in the instant disclosure.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, exemplary computing system 1410 may also include at least one input device 1428 coupled to communication infrastructure 1412 via an input interface 1430. Input device 1428 generally represents any type or form of input device capable of providing input, either computer or human generated, to exemplary computing system 1410. Examples of input device 1428 include, without limitation, a keyboard, a pointing device, a speech recognition device, or any other input device. In at least one embodiment, input device 1428 may perform and/or be a means for performing, either alone or in combination with other elements, one or more of the maintaining, calculating, assigning, providing, obtaining, storing, recommending, adding, updating, identifying, creating, and/or computing steps disclosed herein. Input device 1428 may also be used to perform and/or be a means for performing other steps and features set forth in the instant disclosure.

As illustrated in FIG. 14, exemplary computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. In one example, database 120 from FIG. 1 may be stored in primary storage device 1432.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

In certain embodiments, storage devices 1432 and 1433 may be used, for example, to perform and/or be a means for performing, either alone or in combination with other elements, one or more of the maintaining, calculating, assigning, providing, obtaining, storing, recommending, adding, updating, identifying, creating, and/or computing steps disclosed herein. Storage devices 1432 and 1433 may also be used to perform and/or be a means for performing other steps and features set forth in the instant disclosure.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14. Computing system 1410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1410 may be configured as an application specific integrated circuit (ASIC) adapted to implement one or more of the exemplary embodiments disclosed herein.

Figure 15:
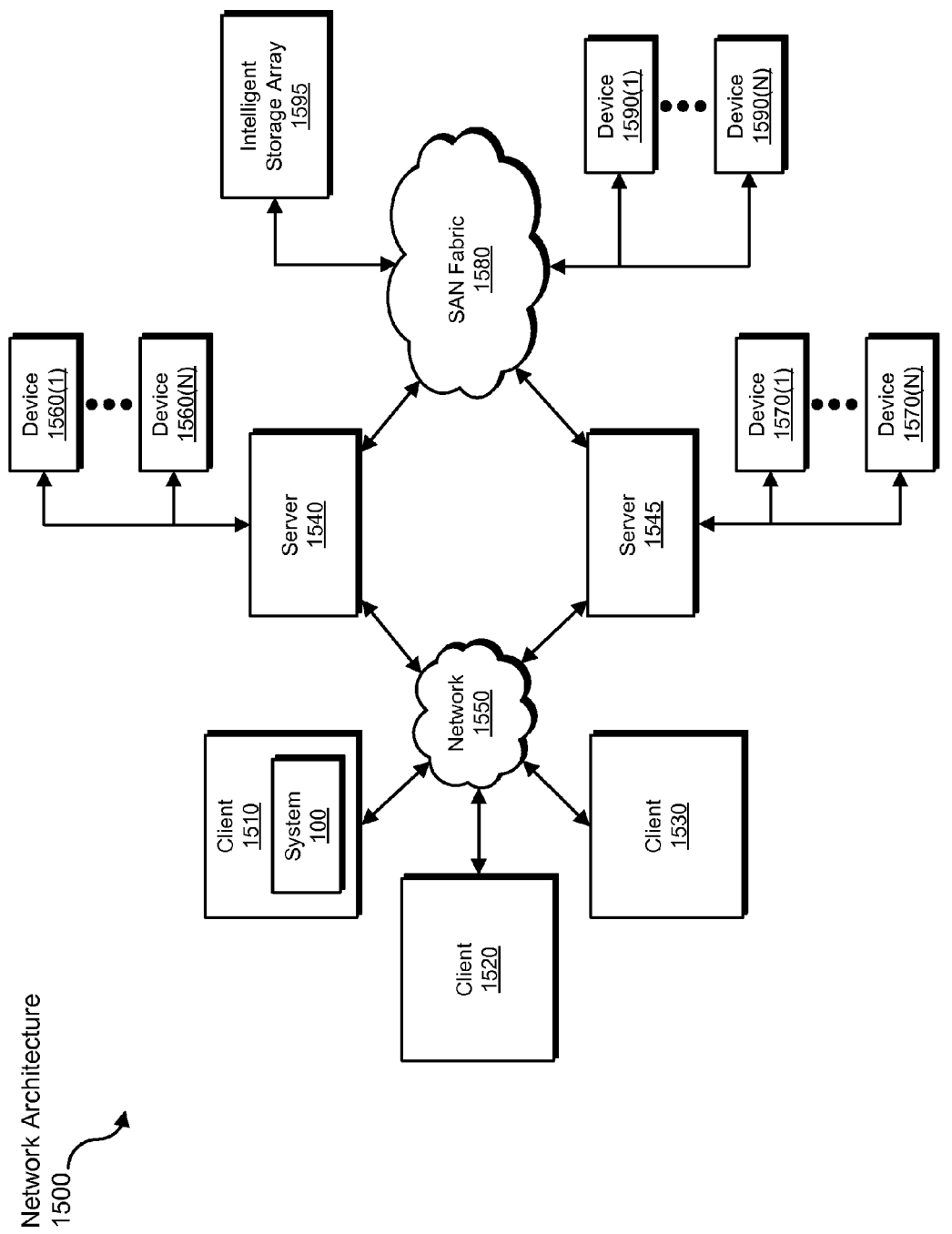
FIG. 15 is a block diagram of an exemplary computing network capable of implementing one or more of the embodiments described and/or illustrated herein.

FIG. 15 is a block diagram of an exemplary network architecture 1500 in which client systems 1510, 1520, and 1530 and servers 1540 and 1545 may be coupled to a network 1550. Client systems 1510, 1520, and 1530 generally represent any type or form of computing device or system, such as exemplary computing system 1410 in FIG. 14.

Similarly, servers 1540 and 1545 generally represent computing devices or systems, such as application servers or database servers, configured to provide various database services and/or run certain software applications. Network 1550 generally represents any telecommunication or computer network including, for example, an intranet, a wide area network (WAN), a local area network (LAN), a personal area network (PAN), or the Internet. In one example, client systems 1510, 1520, and/or 1530 and/or servers 1540 and/or 1545 may include system 100 from FIG. 1.

As illustrated in FIG. 15, one or more storage devices 1560(1)-(N) may be directly attached to server 1540. Similarly, one or more storage devices 1570(1)-(N) may be directly attached to server 1545. Storage devices 1560(1)-(N) and storage devices 1570(1)-(N) generally represent any type or form of storage device or medium capable of storing data and/or other computer-readable instructions. In certain embodiments, storage devices 1560(1)-(N) and storage devices 1570(1)-(N) may represent network-attached storage (NAS) devices configured to communicate with servers 1540 and 1545 using various protocols, such as NFS, SMB, or CIFS.

Servers 1540 and 1545 may also be connected to a storage area network (SAN) fabric 1580. SAN fabric 1580 generally represents any type or form of computer network or architecture capable of facilitating communication between a plurality of storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1560(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to exemplary computing system 1410 of FIG. 14, a communication interface, such as communication interface 1422 in FIG. 14, may be used to provide connectivity between each client system 1510, 1520, and 1530 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1560(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1540, server 1545, storage devices 1560(1)-(N), storage devices 1570(1)-(N), storage devices 1590(1)-(N), intelligent storage array 1595, or any combination thereof. All or a portion of one or more of the exemplary embodiments disclosed herein may also be encoded as a computer program, stored in server 1540, run by server 1545, and distributed to client systems 1510, 1520, and 1530 over network 1550. Accordingly, network architecture 1500 may perform and/or be a means for performing, either alone or in combination with other elements, one or more of the maintaining, calculating, assigning, providing, obtaining, storing, recommending, adding, updating, identifying, creating, and/or computing steps disclosed herein. Network architecture 1500 may also be used to perform and/or be a means for performing other steps and features set forth in the instant disclosure.

As detailed above, computing system 1410 and/or one or more components of network architecture 1500 may perform and/or be a means for performing, either alone or in combination with other elements, one or more steps of an exemplary method for evaluating compliance checks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, system 100 may transform data about a network and the compliance standards active on the network into a recommendation regarding which compliance standards to add or further implement.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for evaluating compliance checks, at least a portion of the method being performed by a computing device comprising at least one processor, the method comprising:

maintaining a group of compliance standards for at least one computing network, each compliance standard comprising at least one compliance check for evaluating at least one aspect of a network device;

calculating a reputation score for at least one compliance check within the group of compliance standards based at least in part on a prevalence of the compliance check within the group of compliance standards that indicates a proportion of compliance standards that include the compliance check;

assigning the reputation score to the compliance check;

providing a recommendation for whether to implement the compliance check based at least in part on the reputation score assigned to the compliance check;

wherein the compliance check evaluates the network device to determine whether the network device is configured in a manner defined by the compliance check.

2. The computer-implemented method according to claim 1, wherein maintaining the group of compliance standards comprises at least one of:

obtaining the group of compliance standards from a single computing network;

obtaining the group of compliance standards from a plurality of computing networks.

3. The computer-implemented method according to claim 1, further comprising storing the group of compliance standards in a centralized database.

4. The computer-implemented method according to claim 1, wherein calculating the reputation score for the compliance check comprises calculating the reputation score for the compliance check based at least in part on:
- the source of origin of the compliance check;
- the efficacy of the compliance check.

5. The computer-implemented method according to claim 1, wherein providing the recommendation comprises recommending modifying a compliance standard to include the compliance check.

6. The computer-implemented method according to claim 1, wherein the reputation score for the compliance check within the group of compliance standards is further based on a proportion of devices that include the compliance check.

7. The computer-implemented method according to claim 1, further comprising
displaying a map that illustrates the prevalence of the compliance check.

8. The computer-implemented method according to claim 1, wherein the magnitude of the reputation score is proportional to the prevalence of the compliance check.

9. The computer-implemented method according to claim 1,
wherein calculating the reputation score for the compliance check comprises calculating the reputation score for the compliance check based at least in part on a number of incidents that are reported on devices that include the compliance check.

10. A system for evaluating compliance checks, the system comprising:
a maintenance module programmed to maintain a group of compliance standards for at least one computing network, each compliance standard comprising at least one compliance check for evaluating at least one aspect of a network device;
a scoring module programmed to:
calculate a reputation score for at least one compliance check within the group of compliance standards based at least in part on a prevalence of the compliance check within the group of compliance standards that indicates a proportion of compliance standards that include the compliance check;
assign the reputation score to the compliance check;
a recommendation module programmed to provide a recommendation for whether to implement the compliance check based at least in part on the reputation score assigned to the compliance check;
at least one processor configured to execute at least one of the maintenance module, the scoring module, and the recommendation module, wherein
the compliance check evaluates the network device to determine whether the network device is configured in a manner defined by the compliance check.

11. The system according to claim 10, wherein the maintenance module maintains the group of compliance standards by at least one of:
obtaining the group of compliance standards from a single computing network;
obtaining the group of compliance standards from a plurality of computing networks.

12. The system according to claim 10, wherein the maintenance module maintains the group of compliance standards by storing the group of compliance standards in a centralized database.

13. The system according to claim 10, wherein the scoring module calculates the reputation score for the compliance check based at least in part on at least one of:
the source of origin of the compliance check;
the efficacy of the compliance check.

14. The system according to claim 10, wherein the compliance standards apply to a common platform.

15. The system according to claim 10, wherein the recommendation module provides the recommendation by recommending modifying a compliance standard to include the compliance check.

16. The system according to claim 10, wherein the scoring module is further programmed to:
identify an additional compliance standard added to the group of compliance standards;
update the reputation score assigned to the compliance check based at least in part on the additional compliance standard.

17. The system according to claim 10, wherein the scoring module is further programmed to:
identify a reputation threshold;
identify at least one high-reputation compliance check within the group of compliance standards that satisfies the reputation threshold;
create a virtual reputation standard that includes the high-reputation compliance check.

18. The system according to claim 17, wherein the scoring module is further programmed to compute an adherence score based on a comparison between a compliance standard that includes the compliance check and the virtual reputation standard.

19. A non-transitory computer-readable-storage medium comprising one or more computer-executable instructions that, when executed by at least one processor of a computing device, cause the computing device to:
maintain a group of compliance standards for at least one computing network, each compliance standard comprising at least one compliance check for evaluating at least one aspect of a network device;
calculate a reputation score for at least one compliance check within the group of compliance standards based at least in part on a prevalence of the compliance check within the group of compliance standards that indicates a proportion of compliance standards that include the compliance check;
assign the reputation score to the compliance check;
provide a recommendation for whether to implement the compliance check based at least in part on the reputation score assigned to the compliance check;
wherein the compliance check evaluates the network device to determine whether the network device is configured in a manner defined by the compliance check.

20. The computer-readable-storage medium according to claim 19, wherein the computer-executable instructions, when executed by the processor of the computing device, further cause the computing device to calculate the reputation score for the compliance check based at least in part on at least one of:
the source of origin of the compliance check;
the efficacy of the compliance check.

* * * * *